United States Patent [19]

Forslund

[11] Patent Number: 4,834,156

[45] Date of Patent: May 30, 1989

[54] TREE STEM FEEDING DEVICE FOR TIMBER HARVESTERS

[75] Inventor: Erik T. Forslund, Alfta, Sweden

[73] Assignee: OSA AB, Alfta, Sweden

[21] Appl. No.: 192,281

[22] PCT Filed: Sep. 7, 1987

[86] PCT No.: PCT/SE87/00400

§ 371 Date: Jun. 24, 1988

§ 102(e) Date: Jun. 24, 1988

[87] PCT Pub. No.: WO88/01925

PCT Pub. Date: Mar. 24, 1988

[30] Foreign Application Priority Data

Sep. 22, 1986 [SE] Sweden ............................... 8603977

[51] Int. Cl.⁴ ..................... B27B 31/00; A01G 23/08; B27L 1/00

[52] U.S. Cl. ............................... 144/242 D; 144/2 Z; 144/3 D; 144/245 A; 198/628

[58] Field of Search ............... 198/628; 144/2 Z, 3 D, 144/242 R, 245 R, 245 A

[56] References Cited

U.S. PATENT DOCUMENTS 3,763,905 10/1973 Hamilton et al. ................... 144/2 Z
4,515,192 5/1985 Eriksson .
4,742,854 5/1988 Forslund ............................. 144/2 Z

FOREIGN PATENT DOCUMENTS 429020 8/1983 Sweden .
8402708 5/1984 Sweden .
437145 2/1985 Sweden .
444132 3/1986 Sweden .
446837 10/1986 Sweden .
572794 2/1976 Switzerland .

*Primary Examiner*—W. Donald Bray

*Attorney, Agent, or Firm*—McFadden, Fincham, Marcus & Allen

[57] ABSTRACT

A feeding device for longitudinally feeding a tree stem comprises a breast part (2, 2') to be applied against the stem, and two separate feeding units (3, 3'), suitably in the form of endless chains which are movable towards and away from each other, such that they can be pressed against opposite sides of the stem. Each feeding unit is mounted on a holder (7) which is connected to a frame (1) carrying the breast part, by means of a parallel arm system comprising two arms (8, 9) each connected to the holder (7) and the frame (1) by joints 10, 11, 12, 13) whose axes of rotation extend at an acute angle to the axes of rotation of the feeding units. A piston and cylinder assembly (14) is mounted in a conventional way between diagonally opposite joints in the parallel arm system for pivoting the arms relative to the frame for automatically centering the device relative to the tree stem irrespective of varying stem diameters.

5 Claims, 2 Drawing Sheets

TREE STEM FEEDING DEVICE FOR TIMBER HARVESTERS

TECHNICAL FIELD OF THE INVENTION

This invention relates to a feeding device for producing a longitudinally directed relative movement between a tree stem and the device proper, comprising a breast part to be applied against the stem, and at least two separate feeding units which are movable towards and away from each other for application against opposite sides of the stem.

BACKGROUND OF THE INVENTION

In mechanised forestry, use is made of feeding devices of the type described above, both in one-grapple harvesters (processing standing trees by felling, limbing and cutting) and in twin-grapple harvesters or processors limbing and cutting trees already felled. In one-grapple harvesters, the feeding units generally consist of so-called spiked rollers, while vehicle-type rubber wheels are generally employed in twin-grapple harvesters. In recent times, attempts have also been made to use different types of endless rotary belts for this purpose. Especially promising is the type of feeding units disclosed in SE patent application 8601628-4, utilising a plurality of links provided on the outside of a rigid guide bar and together forming an endless belt-like element.

A general desire in forest machinery is to reduce the dimensions and the weight of the components used, including the feeding units. However, this desire gives rise to problems in such cases where the harvester should be uesd for both large and small trees since the feeding units must then be designed with an exceptionally large width to be able to process trees within the entire dimensional range which in practice goes from about 40 mm (small trees from thinnings) up to 400-500 mm (full-grown trees from final fellings).

BRIEF ACCOUNT OF THE INVENTIVE CONCEPT

The present invention aims at solving the above-mentioned problems by providing narrow, conveniently operated feeding units in harvesters for processing tree stems of highly varying diameters. According to the principle of the invention, this is achieved in that each feeding unit is mounted on a holder which is connected to a frame carrying or forming said breast part, by means of a parallel arm system comprising two arms each connected to said holder and said frame by joints whose axes of rotation extend at an acute angle, particularly 45°, to the axes of rotation of said feeding units, and that a piston and cylinder assembly is mounted in a conventional manner between diagonally opposite joints in said parallel arm system for pivoting said arms relative to said frame for automatically centring the device relative to the stem irrespective of varying stem diameters.

BRIEF DESCRIPTION OF THE ACCOMPANYING DRAWINGS

In the drawings,

FIG. 1 is a perspective view of a simplified model including the essential components of the invention, FIG. 2 is a side view of the same model, and FIG. 3 is a top plan view illustrating the function of the model or device during feeding of a tree stem.

DETAILED DESCRIPTION OF THE BASIC FEATURES AND OPERATION OF THE INVENTION

Figure 1:
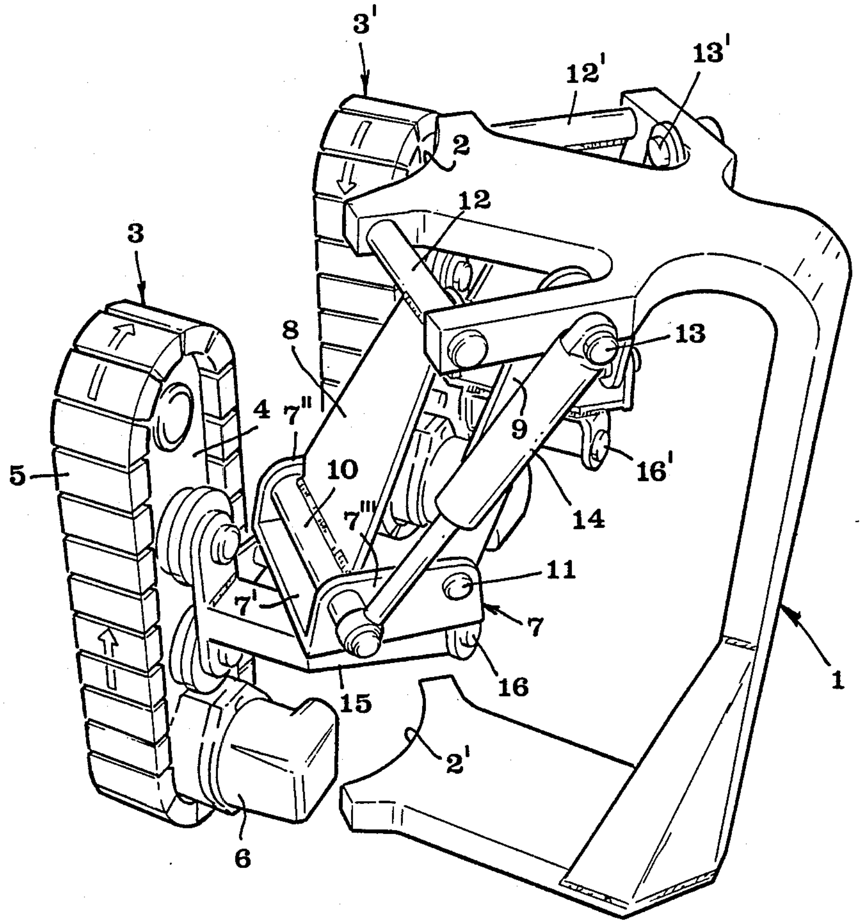

In FIG. 1, reference numeral 1 generally designates a frame which in practice may be included in a harvester of the one-grapple or the twin-grapple type and be tiltably mounted on e.g. the crane tip of a wheel-mounted forest machine. The frame is associated with two rounded seats or engagement means, 2, 2′ which together form a so-called breast part to be applied against a tree stem in connection with the application of two feeding units 3, 3′ against the stem (for application against standing trees, the device is held in the upright state as shown in FIG. 1, while for application against lying trees, the device is turned 90°).

The two feeding units 3, 3′ may advantageously be of the type disclosed in greater detail in SE patent application 8601628-4. Thus, each feeding unit comprises a guide bar-like, rigid frame element 4 along the perifery of which there are provided a plurality of links 5 which together form an endless belt-like feeding element. At one end of the guide bar element 4, there is provided a driving gear wheel (not shown) connected to a drive unit 6, suitably in form of a hydrualic motor by means of which the gear wheel can be rotated for driving the belt or chain 5, for instance in the direction of the arrows shown in FIG. 1. In practice, the links of the chain 5 may have a width of 100-200, suitably about 150 mm. It should also be pointed out that the axis of rotation of the driving gear wheel extends parallel to the longitudinal extension of the links.

Each feeding unit is mounted on the underside of a holder, generally designated 7, which is connected to the frame 1 via a parallel arm system comprising two arms 8, 9 each connected to the holder 7 and the frame 1 by joints 10, 11, 12, 13 whose axes of rotation extend at an acute angle, in this case more specifically 45°, to the axes of rotation of the feeding units. In the illustrated embodiment, the holder 7 is a plate of U-shaped cross-section, which has a bottom 7′ and two upright side members 7″, 7‴, the hinge pin 10 extending the entire distance between the side members 7″, 7‴. Similarly, the hinge pin 12 is relatively long so that the arm 8 can be given a substantial width and, hence, considerable rigidity with a view to positively guiding the holder 7 such that it will always move in a plane oriented at an angle of 45° out from or towards the frame. In this context, it should be pointed out that, for weight-saving purposes, the illustrated single arm 8 may in principle be replaced by two arms mounted in spaced-apart relationship on the hinge pins 10, 12 and having a relatively small width, yet retaining the same guiding ability. For pivoting the arms 8, 9 of the parallel arm system, a piston and cylinder assembly 14 in the form of a double-acting cylinder is mounted in a conventional manner between diagonally opposite hinges or joints of the parallel arm system, in this case the joints 10, 13.

The supporting bracket or part 15 on which the guide bar 4 is mounted is hingedly connected to the holder 7, namely by a hinge pin 16 which allows the guide bar to tilt at least slightly relative to the holder, e.g. 2°-10°. The hinge pin 16 extends parallel to the axis of rotation of the associated feeding unit 3, i.e. at an angle of 45° to the hinge pin 10. By its tiltability relative to the holder 7, the feeding unit 3 is able to follow unevennesses in the tree stem against which the feeding unit concerned is applied.

Figure 3:
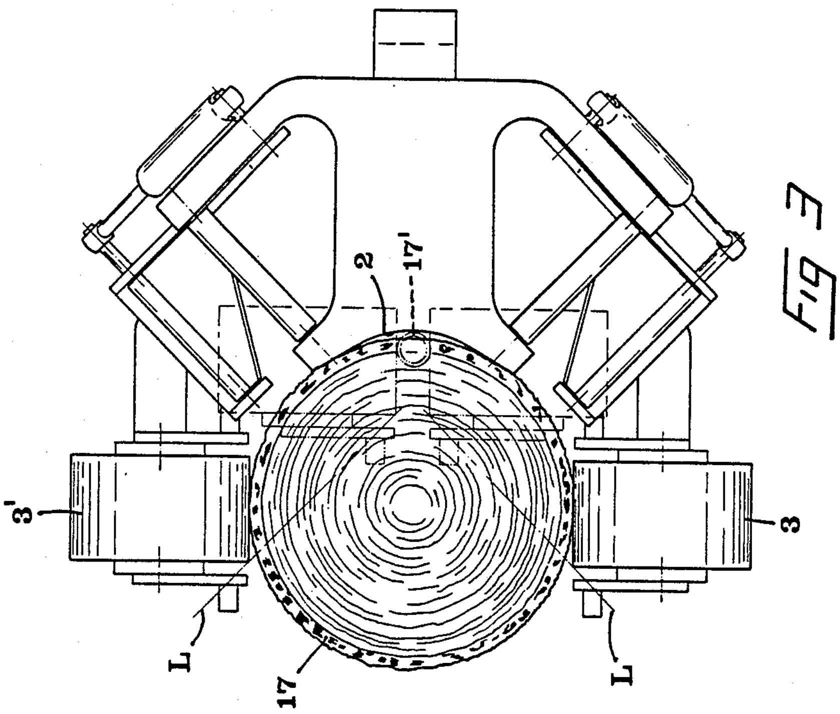
Figure 2:
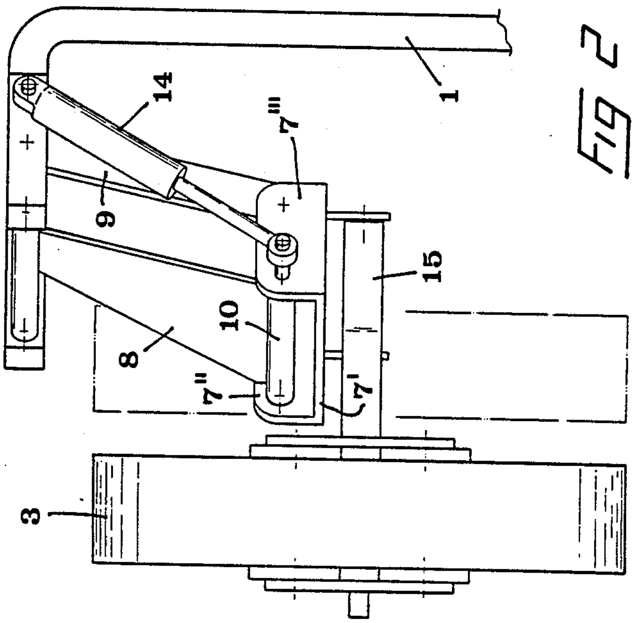

In FIG. 3, reference numeral 17 shows a relatively large tree stem (e.g. in the range of 400–500 mm) while 17' designates an extremely small stem (e.g. about 40 mm). When the feeding units 3, 3' are applied against diametrically opposite sides of the large stem 17, the two holders 7 are held in a swung-out position relatively far away from the frame 1 by the two parallel arm systems 8, 9 (substantially as shown in FIG. 1). If it is thereafter desirable to apply the feeding units against the small stem 17', which in the same way as the large stem is engaged by the positioning breast part 2, 2' of the frame 1, the paralle arm system is pivoted inwards towards the frame, whereby the two feeding units 3, 3', in accordance with the inventive principle, will move not only with a first component of motion in a direction towards each other, but also with a second component of motion at right angles thereto in a direction inwards towards the frame 1 so as to produce a composite linear motion (see dash-dot lines L) which makes an angle of 45° with said components of motion. In other words, the device will be automatically centred in relation to the tree stem such that the two feeding units, despite their relatively small witdh, are always located on diametrically opposite sides of the stem with the centre thereof located approximately midway between the feeding units while the stem, irrespective of its diameter, is concurrently held applied against the breast part 2.

POSSIBLE MODIFICATIONS OF THE INVENTION

It goes without saying that the invention is not restricted only to the embodiment described above and schematically illustrated in the drawings. Thus, the illustrated, per se preferred feeding units 3 of the belt or chain type can be replaced by other types of feeding units, e.g. rollers (optionally spiked rollers) or wheels, e.g. rubber wheels. Further, it should be pointed out that the breast part used may in practice advantageously be designed as a continuous, suitably cradle- or channel-shaped support member instead of the two separate seats 2 and 2' illustrated in FIG. 1. While it is preferable to have the holder 7 and the associated feeding unit move precisely at an angle of 45° to the axes of rotation of the feeding units, it is also conceivable to have the units move at another acute angle, e.g. in the range of 30°–60°.

I claim:

1. A feeding device for effecting longitudinal relative movement between said device and a tree stem fed therethrough, said feeding device comprising:

a frame, said frame having engaging means for engaging said tree stem;

at least a pair of separate rotatable feeding units movable toward and away from each other for engagement with opposite sides of said tree stem, said feeding units being rotatable through spaced-apart axes of rotation;

a holder for mounting of said feeding units thereon;

a parallel arm system connecting said holder to said frame, said arm system comprising a pair of arms each rotatably connected to said holder and said frame by opposed joints having axes of rotation extending at an acute angle to said axes of rotation of said feeding units;

a piston and cylinder assembly mounted between said opposed joints in said parallel arm system for effecting pivotal movement of said arms relative to said frame;

whereby said device is automatically centered relative to said three stem regardless of tree stem diameters.

2. A feeding device as claimed in claim 1 wherein said feeding units are mounted on bracket means hingedly connected to said holder.

3. A feeding device as claimed in claim 2, wherein said bracket means are connected to said holder by a hinge pin extending parallel to the axis of rotation of said feeding unit to thereby permit tilting of said feeding unit.

4. A feeding device as claimed in claim 1, wherein said feeding units comprise a member selected from the group consisting of wheels, rollers, belts and chains.

5. A feeding device as claimed in claim 1 wherein said acute angle is an angle of 45°.

* * * * *